US009864604B2

(12) United States Patent
Vahidsafa (10) Patent No.: US 9,864,604 B2
(45) Date of Patent: Jan. 9, 2018

(54) DISTRIBUTED MECHANISM FOR CLOCK AND RESET CONTROL IN A MICROPROCESSOR

(71) Applicant: Oracle International Corporation, Redwood City, CA (US)

(72) Inventor: Ali Vahidsafa, Palo Alto, CA (US)

(73) Assignee: Oracle International Corporation, Redwood City, CA (US)

( * ) Notice: Subject to any disclaimer, the term of this patent is extended or adjusted under 35 U.S.C. 154(b) by 57 days.

(21) Appl. No.: 14/731,216

(22) Filed: Jun. 4, 2015

(65) Prior Publication Data

US 2016/0357571 A1 Dec. 8, 2016

(51) Int. Cl.
*G06F 9/44* (2006.01)
*G06F 13/362* (2006.01)

(52) U.S. Cl.
CPC .......... *G06F 9/4401* (2013.01); *G06F 13/362* (2013.01)

(58) Field of Classification Search
CPC ........ G06F 9/4401; G06F 13/362; G06F 1/24; G06F 13/36
See application file for complete search history.

(56) References Cited

U.S. PATENT DOCUMENTS

| | | | | |
|---|---|---|---|---|
| 5,003,463 A * | 3/1991 | Coyle | ................. | G06F 13/4059 710/57 |
| 5,101,478 A * | 3/1992 | Fu | ........................ | G06F 13/126 710/1 |
| 5,261,057 A * | 11/1993 | Coyle | ................. | G06F 13/4059 710/310 |
| 5,870,602 A * | 2/1999 | Miller | ....................... | G06F 1/24 711/166 |
| 6,463,529 B1 * | 10/2002 | Miller | ....................... | G06F 1/24 713/2 |
| 2003/0172189 A1 * | 9/2003 | Greenblat | ............... | G06F 15/78 709/251 |
| 2004/0252680 A1 * | 12/2004 | Porter | ................... | H04L 12/437 370/360 |
| 2004/0268060 A1 * | 12/2004 | Mehta | ................. | G06F 15/8007 711/148 |
| 2005/0030902 A1 * | 2/2005 | Choi | ................... | H04L 12/6418 370/252 |
| 2008/0016269 A1 * | 1/2008 | Chow | ................. | G06F 13/1684 711/103 |

(Continued)

*Primary Examiner* — Thomas Lee
*Assistant Examiner* — Chad Erdman
(74) *Attorney, Agent, or Firm* — Polsinelli PC (57) ABSTRACT

Implementations of the present disclosure involve a system and/or method for implementing a reset controller of a microprocessor or other type of computing system by connecting the reset controller to a reset controller bus or other type of general purpose bus. Through the reset bus, the reset controller signals used to generate the reset sequence of the system may be transmitted to the components of the system through a bus, rather than utilizing a direct wire connection between the components and the reset controller. The wires that comprise the reset bus may then be run to one or more components of the microprocessor design that are restarted during the reset sequence. Each of these components may also include a reset controller circuit that is designed to receive the reset control signals from the reset controller and decode the signals to determine if the received signal applies to the component.

18 Claims, 6 Drawing Sheets

(56) References Cited

U.S. PATENT DOCUMENTS

2013/0268747 A1* 10/2013 Chang .................... G06F 13/14
                                                          713/2
2014/0244885 A1* 8/2014 Tsirkin ................ G06F 13/4027
                                                          710/306

* cited by examiner

DISTRIBUTED MECHANISM FOR CLOCK AND RESET CONTROL IN A MICROPROCESSOR

FIELD OF THE DISCLOSURE

Aspects of the present invention relate to computing systems and, more particularly, aspects of the present invention involve an apparatus and/or circuit for distributing a clock and reset control signal in a microprocessor or other integrated circuit.

BACKGROUND

Computers are ubiquitous in today's society. They come in all different varieties and can be found in places such as automobiles, laptops or home personal computers, banks, personal digital assistants, cell phones, as well as many businesses. In addition, as computers become more commonplace and software becomes more complex, there is a need for the computing devices to perform faster and more reliably in smaller and smaller packages. For example, many computing systems include one or more microprocessors with many thousands of components and connections between the components. As these components and the computing device itself become smaller, the design of the computing system becomes increasingly complex and difficult to manufacture.

One particular example of the difficulty of microprocessor and computing system design is illustrated upon a reset of the computing system. In general, a reset of a computing system requires multiple components of the system to be restarted, and often in a particular sequence to ensure proper operation of the system. This restarting sequence of components of the computing system is often controlled by a reset controller circuit or component of the system. This reset controller circuit generally executes the reset sequence by transmitting and/or receiving signals with one or more of the components of the computing system. In one particular example, these reset control signals are transmitted on wires in the computing system. For complex computing designs, thousands of wires communicating the reset control signals from the reset controller may be used that run throughout the system design. For computing systems with large computing power in relatively small packages (such as high-performance microprocessors), use of thousands of control signal wires consumes valuable space within the chip design that may alternatively be used to increase the performance of the computing system. Further, reset control wires also often must be designed around particular sections of the computing system to avoid interacting with one or more power domains of the design such that the design of the computing system becomes even more difficult.

It is with these and other issues in mind that various aspects of the present disclosure were developed.

SUMMARY

One implementation of the present disclosure may take the form of a microelectronic circuit. The circuit may include a plurality of logic portions of the microelectronic circuit, each of the plurality of logic portions comprising at least one component configured to be resettable during a restart of the microelectronic circuit, a reset communication bus in electrical communication with each of the plurality of logic portions, a reset controller electrically connected to the reset communication bus and configured to transmit one or more reset control messages comprising an address and a command on the reset communication bus and receive one or more response messages from the reset communication bus. Further, each of the plurality of logic portions receive each of the one or more reset control messages transmitted on the reset communication bus from the reset controller and each of the plurality of logic portions is configured to obtain the reset control message address of the received one or more reset control messages and execute the reset control message command.

Another implementation of the present disclosure may take the form of a method for resetting a microelectronic circuit. The method includes the operations of transmitting, from a reset controller, one or more reset control messages comprising an address and a command on a reset communication bus to a plurality of logic portions of the microelectronic circuit, wherein each of the plurality of logic portions is in electrical communication with the reset communication bus and comprises at least one component configured to be resettable during a restart of the microelectronic circuit and receiving from the reset communication bus one or more response messages from the reset communication bus. Further, each of the plurality of logic portions receive each of the one or more reset control messages transmitted on the reset communication bus from the reset controller and each of the plurality of logic portions is configured to obtain the reset control message address of the received one or more reset control messages and execute the reset control message command.

DETAILED DESCRIPTION

Implementations of the present disclosure involve a system and/or method for implementing a reset controller of a microprocessor or other type of computing system by connecting the reset controller to a reset controller bus or other type of general purpose bus. By connecting the reset controller to the reset bus, the reset controller signals which orchestrate the reset sequence of the system may now be transmitted to the components of the system through a bus, rather than utilizing a direct wire connection between the components and the reset controller. In one particular example, the reset bus may comprise twenty wires on which the reset control signals may be transmitted to control the reset sequence. The wires that comprise the reset bus may then be run to one or more components of the microprocessor design that are restarted during the reset sequence. In other words, the components of the circuit design may connect to the reset bus to receive one or more reset control signals. Each of these components may also include a local reset controller circuit that is designed to receive the reset control signals from the central reset controller and decode the signals to determine if the received signal applies to the component. The local reset controller circuit for the components may also be designed to allow one or more return reset status signals to be transmitted on the reset bus back to the central reset controller. In this manner, a reset bus may be utilized by the computing system to transmit reset control/status signals to/from the components of the system to the central reset controller mechanism of the computing system.

In one particular embodiment, the reset control signals transmitted on the reset bus are packaged into packets that are decoded by the local reset control circuits of the components of the system. Thus, a command from the central reset controller to the component may include one or several packets transmitted along the reset bus. Further, the reset bus may be adaptable to correspond to the overall microprocessor design. Thus, in one particular embodiment, the reset bus may be configured to branch from the main bus design into the circuit design to communicate with one or more components within the circuit. This branching configuration may be used, for example, when a particular portion of the microprocessor design includes a power domain through which the reset bus lines cannot traverse. Also, the reset bus is configured such that inbound control signals (reset command signals from the central reset controller to one or more components of the design) and outbound status signals (reset status signals from one or more components of the design to the central reset controller) travel on the reset bus. In one particular embodiment, the inbound signals and outbound signals may be transmitted on the reset bus simultaneously.

Figure 1:
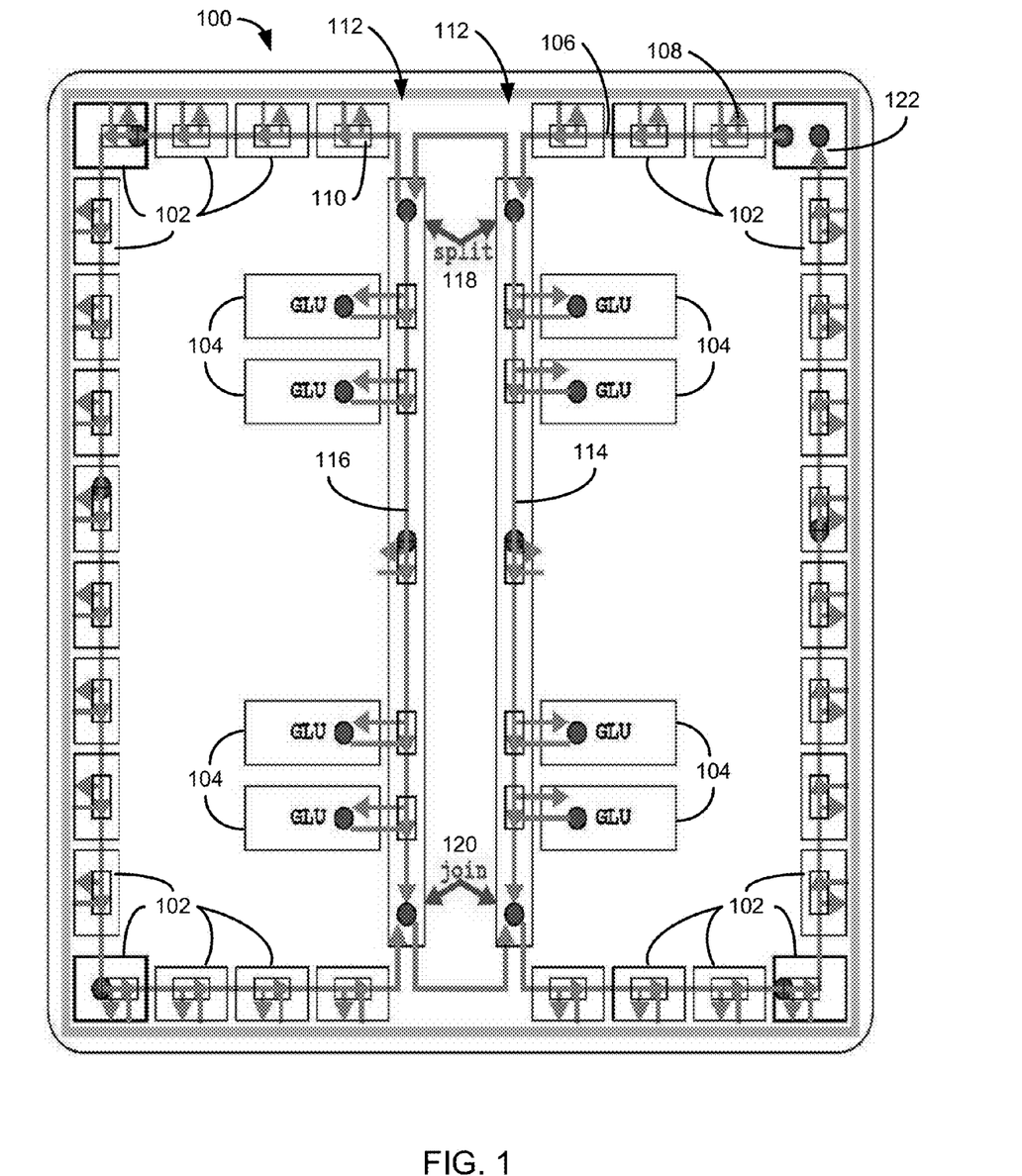
FIG. 1 is a circuit diagram illustrating an example of a reset control bus utilized in implementing embodiments of the present disclosure.

FIG. 1 is a circuit diagram illustrating an example of a reset control bus utilized in implementing embodiments of the present disclosure. In general, the circuit 100 of FIG. 1 may be a circuit for any computing device. In one example, the circuit 100 is a portion of a microprocessor. Also, the components of the circuit 100 may be only a part of the overall computing system. Thus, although different components of the circuit are discussed below, it should be appreciated that the components and connections illustrated may be but a part of the overall computing system.

As mentioned, the circuit or microprocessor 100 may include any number of components 102. Such components may be physical components of the circuit or may be sub-circuits or units of the circuit. For example, the components 102 may include memory portions of the system, logic components or circuits, execution portions or units, clocking components or circuits, etc. In general, any circuit portion or component that receives a reset control signal during a reset of the circuit may be considered a component 102 of the circuit 100 of FIG. 1. A reset bus 106 may connect each of the components 102 of the circuit 100 to transmit one or more reset control and status signals to and from the components. Although shown in FIG. 1 as forming a ring or circle on the outer edge of the circuit layout through the components 102, the reset bus 106 may be oriented in the circuit 100 in any fashion. Further, as discussed in more detail below, one or more branches 112 of the reset bus may be connected to or otherwise in communication with a main branch 106 of the reset bus to carry the reset control signals along the one or more branches 112. These branches may connect components 104 within the interior of the circuit 100 to the reset bus 106. Similar to above, the interior components 104 connected to the branches 112 of the reset bus 106 may include any number of components of the circuit and may be physical components of the circuit or may be sub-circuits or units of the circuit.

Each of the components 102 and the interior components 104 in communication with the reset bus 106 may also include a reset bus interface circuit 110. The interface circuit 110 for each component 102, 104 is configured to receive the signals on the reset bus 106 through an interface line 108 connected to the reset bus. The interface circuit 110 may also include a controller circuit (referred to herein as a "local controller" or "local controller circuit") that receives the reset control signals from the reset bus 106 and controls the reset protocol for the respective component 102. In other words, the local controller receives reset instructions from the central reset controller on the reset bus 106, executes those instructions in the corresponding component 102, and may or may not transmit back an acknowledgement message on the reset bus through the interface circuit 100. In one particular embodiment, the reset control signals may include an address associated with one or more of the components 102, 104 connected to the bus. The interface circuit 110 for the components 102, 104 may utilize the address associated with the one or more control signals to determine which component should execute the command. In this manner, the reset controller may transmit reset control signals to the components that are then executed by the components 102, 104 for which the control signal is intended.

As discussed above, the reset bus 106 may include one or more branches 112. In the particular implementation illustrated in FIG. 1, the branching of the reset bus 106 is implemented by including three rings of the reset bus 106, illustrated as one outer ring 106 and two interior rings 114, 116. The implementation of the circuit 100 is but one way by which the reset bus 106 may branch 112 into the interior of the circuit. The outer reset bus ring 106 forms the longest portion of the reset bus and traverses the outer edge of the circuit design. Also, in general, the rings of the reset bus operate as described above. Thus, reset control signals may be transmitted on the outer ring 106 reset bus to the components in communication with the outer ring. The inner rings (shown as a right ring 114 and a left ring 116) form two smaller reset bus rings located within the outer ring 106. As shown the right inner ring 114 includes a bus with a transmission path that communicates with a portion of the outer components 102 of the circuit, branches away from the outer ring at circuit position 112, traverses through the interior of the circuit design, and returns along the outer edge of the circuit back to the reset controller 122. The left inner ring 116 forms a similar ring along the left side of the circuit 100 that includes a left-side reset bus path through the interior of the circuit 100. As explained in more detail below, the reset bus 106 may include one or more split circuits 118 or join circuits 120 at the branch locations 112 in the reset bus to accommodate the transmission of the reset control signals to each component along the reset bus path.

Regardless of the path the reset bus 106 takes through the circuit 100, one or more components 102, 104 of the circuit connect to the reset bus to receive the reset control signals from the reset controller. As mentioned above, each component 102, 104 associated with the reset bus 106 receive each reset control signal from the reset controller. Further, one or more components 102, 104 may receive an acknowledgement message provided by another component as it is transmitted on the reset bus 106 back to the reset controller. In general, any component connected to the reset bus 106 may receive both reset requests from the central reset controller (referred to herein as "outbound" or "SB" messages) and reset status responses from one or more components of the circuit (referred to herein as "inbound" or "NB" messages). As such and as described above, an addressing scheme is implemented in each of the interface circuits 110 associated with each component 102, 104 connected to the reset bus 106.

Each component 102, 104 connected to the reset bus 106 may be addressed or otherwise identified by the reset controller. For example, a component connected to the reset bus 106 may be associated with a binary number that identifies the particular component. In one example, each component may be addressable by a 32-bit binary number. During transmission of reset control signals on the reset bus 106, the address may be included in the transmitted messages, as explained in more detail below. As the components receive the transmitted messages including the address, the full address of the transmitted message may be unpacked, decoded, or otherwise determined by the interface circuit 110 of the components. In this manner, each component connected to the reset bus 106 may determine if each received message from the reset bus is intended for itself. When a control signal or message is received at the address associated with the particular component 102, the component may execute the command. If a message is received that does not include the address for the particular component 102, the message may be ignored by the component.

Figure 2:
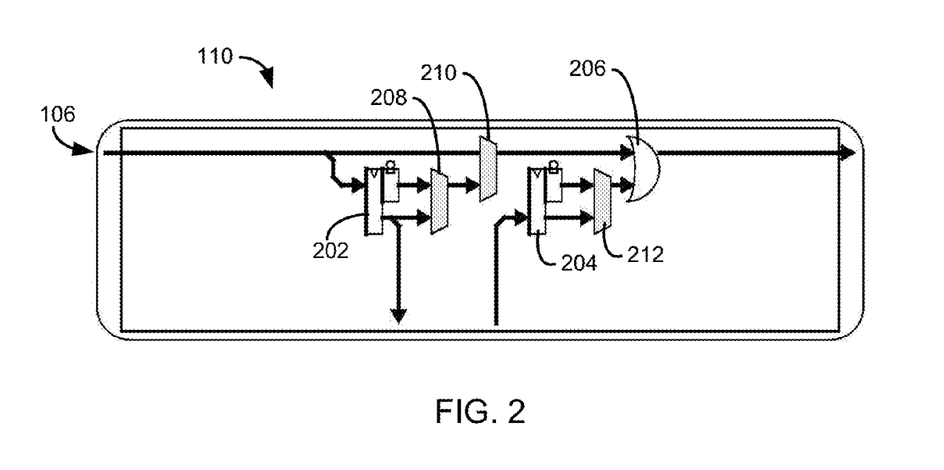
FIG. 2 is a circuit diagram illustrating an interface circuit to a reset bus for a component of a microprocessor.

One embodiment of the interface circuit 110 of the components 102, 104 is illustrated in FIG. 2. In particular, the interface circuit 110 illustrates the connection between the component associated with the interface circuit and the reset bus 106. As shown, the reset bus 106 may be presented as an input to an input latch 202, the output of which is connected to the component. In particular, the output of the input latch 202 may be connected to an address determining circuit to unpack the address from the messages on the reset bus 106 and determine if the address in the messages matches the address associated with the component 102. If the messages are intended for the component, an execution circuit or other logic may be utilized by the component to execute the received messages. Upon execution, an acknowledgement message may be transmitted from the component 102 as an input to an output latch 204 of the interface circuit 110. The output latch 204 may then provide the acknowledgement message back onto the reset bus 106 through a logic OR gate 206. Various multiplexers 208-212 may also be included in the interface circuit 110 to provide timing options for the transmission of the messages through the interface circuit 110.

In the particular example shown in FIG. 2, the reset control signals or messages on the reset bus 106 are 18-bit packets that include a 16-bit packet and two signal bits (sb_vld and nb_vld) that indicate whether the message is a NB message or SB message. This 18-bit packet may be utilized for reset bus 106 configurations that include 18 or more transmission wires. It should be appreciated, however, that the reset bus 106 may include any number of transmission wires and/or the message packets may include any number of bits. In addition, a reset control message may include a plurality of such packets to transmit the entire control message. For example, a control message may include a 40-bit address with 64-bits of data for the complete reset control message. This message may be transmitted in any number of message packets such that the entire message is received at the component prior to execution of the message. The component 102, 104 may be configured or programmed to store each message packet intended for that component until all of the packets have been received for a complete reset control message. For received packets not intended for the particular component 102, 104, the packets may be ignored or dismissed by the component. In a similar manner, acknowledgement messages from the component 102 transmitted on the reset bus 106 may also include any number of message packets.

Figure 3:
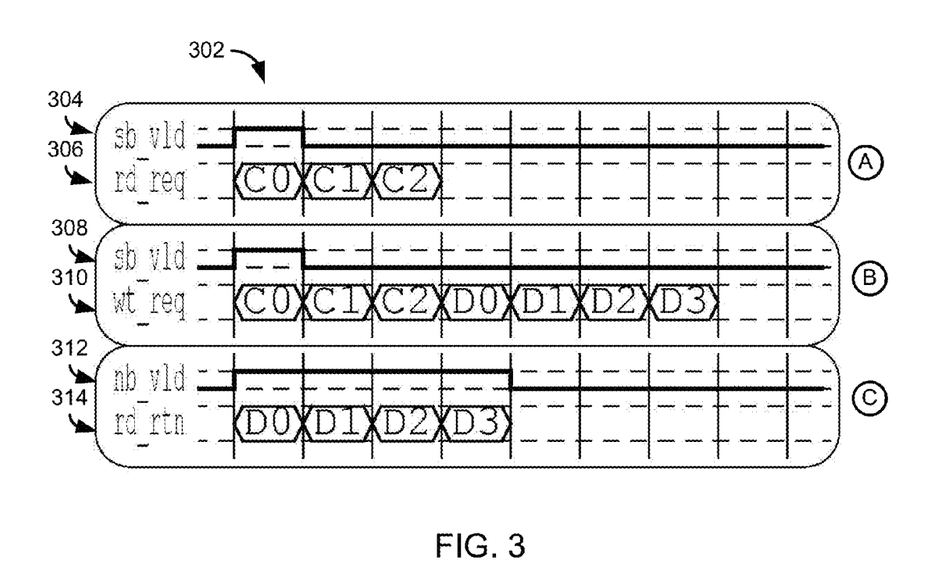
FIG. 3 is a timing diagram illustrating transmission of reset control packets and validation signals on the reset bus to components of a circuit.

FIG. 3 is three timing diagrams illustrating transmission of reset control packets and validation signals on the reset bus to components of a circuit. The timing diagram of FIG. 3 is but one transmission scheme that may be utilized when transmitting reset control signals on the reset bus 106. As discussed above, these signals may be received at every component 102, 104 connected to the reset bus 106 for control of a reset procedure of a microprocessor.

As mentioned, a wire of the reset bus 106 may be associated with a SB valid signal 304 provided by the reset controller. In general, an asserted SB valid signal indicates that the packets on the reset bus 106 are valid SB messages intended for one or more components 102, 104 of the circuit 100. Thus, when a component receives an asserted SB valid signal (such as at time 302 of timing diagram A), the interface circuit 110 of the components 102, 104 connected to the reset bus 106 begins receiving, storing, or otherwise obtaining packets from the reset bus. The packets transmitted on the reset bus 106 are illustrated in timing diagram A as signal 306. In particular, the packet signal 306 of timing diagram A is a read request made by the reset controller of the circuit 100 to one or more components 102, 104. In one embodiment, the read request status of the packets is indicated by a particular bit of the first packet "C0". Thus, the components 102, 104 upon seeing the asserted SB valid signal 304 at time 302, begin analyzing the packets 306 transmitted on the reset bus 106. A bit or plurality of bits in packet C0 indicates that the reset control message is a read request. In addition, the components 102, 104 receive packets C1 and C2 from the reset bus 106. With each packet received, the components 102, 104 may determine the address contained within the packets to determine for which component the read request is intended. The component 102, 104 associated with the address included in the packets C0-C2 may then execute the read request from the reset controller. The other components, upon determining that the read request was not intended for them, may flush the packets from memory at the component and monitor for future packets.

In one embodiment, the components 102, 104 are configured to obtain a certain number of packets from the reset bus 106 upon determining the type of reset control message being transmitted. Utilizing the above example, the components 102, 104 upon determining the request is a read request, may obtain three packets (C0-C2) from the reset bus 106 to ensure that the entire address of the message is received before execution. In other cases, such as the write request message case discussed below, more packets may be obtained from the reset bus 106. In general, each component may be programmed to obtain a specific number of packets from the reset bus 106 based on the type of the control message. In other embodiments, the components 102, 104 may simply store every packet received until an entire address or control message is received.

Timing diagram B of FIG. 3 illustrates a write request reset control message. In particular, the write request includes an asserted SB valid signal 308. This signals the components 102, 104 connected to the reset bus 106 to begin receiving packets 310 from the bus. Similar to above, the components may then obtain packet C0 from the reset bus 106. Also similar to above, the components may begin unpacking packet C0 and determine that a write request command is issued by the reset controller. Through packets C0-C2, the address for the particular component or components to which the write request is intended is determined. Additionally, data packets may also be provided on the reset bus 106, illustrated in the timing diagram as data packets D0-D3. In general, any number of data packets may be provided on the reset bus 106 for a write request command. The data included in the data packets is the data that is to be written to memory by the component 102, 104 to which the reset control command applies. Also as mentioned above, the number of data packets and/or address packets may be known by the component or otherwise provided to the component such that the component may know the number of packets to receive from the reset bus 106 for the write command.

The components 102, 104 may also provide an acknowledgement message or provide data back to the reset controller on the reset bus 106. For example, in response to a read request received at a component 102, 104, the component may provide the requested data to the reset controller. In one embodiment, the interface circuits 110 of the components 102, 104 may provide signals and packets on the reset bus 106, such as those illustrated in the timing diagram C of the FIG. 3. The example shown in timing diagram C is a read return message provided by a component to the reset controller. As shown, the NB valid signal 312 is asserted. However, for NB messages on the reset bus 106, the NB valid signal 312 is asserted for the entirety of the message. This is done to signal to the reset controller when the message is complete. Along with the asserted NB valid signal 312, data packets 314 are transmitted on the reset bus 106. In the particular example shown, four data packets D0-D3 are transmitted as part of the read return message on the reset bus 106. At the end of the last data packet D3, the NB valid signal 312 is de-asserted indicating that the read return message is complete at the D3 packet. Through the signaling protocol described above, reset control messages and acknowledgements or return messages may be transmitted on the same reset bus 106 utilizing a relatively small number of transmission wires to perform the reset procedure for a computing system.

Figure 4:
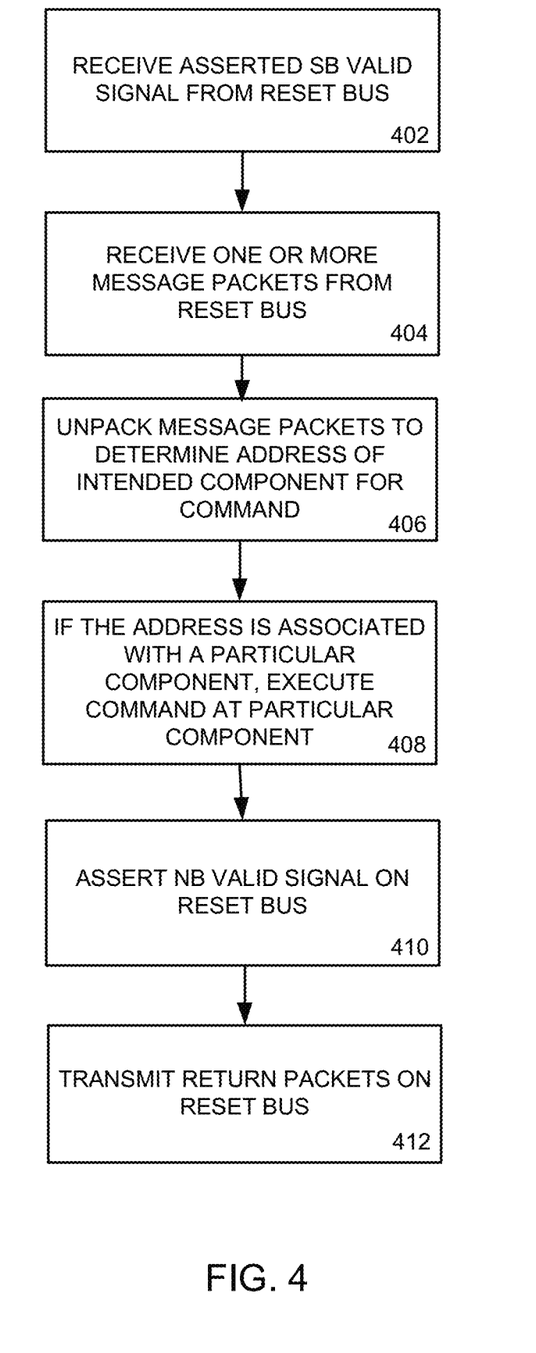
FIG. 4 is a flowchart for a method for a component of a computing system to receive and transmit messages on a reset bus of the system.

FIG. 4 is a flowchart for a method for a component of a computing system to receive and transmit messages on a reset bus of the system. In one embodiment, the operations may be performed by a component 102, 104 of a microprocessor 100 that is part of a reset procedure for the microprocessor. In particular, the operations may be performed by the interface circuit 110 of the components connected to a reset bus 106 of the circuit 100. The operations may be performed through one or more hardware components (such as logic devices), a software program executed by the component, or a combination of hardware and software.

In operation 402, the interface circuit may receive an asserted SB valid from the reset bus. This signal indicates to the interface circuit that a command is being transmitted on the reset bus. In operation 404, the interface circuit than receives one or more message packets from the reset bus. As explained above, these message packets may include an address indicating the component of the circuit to which the command applies and data packets containing information concerning the command. In operation 406, the interface circuit may unpack one or more of the message packets to determine the address included in the packets. As mentioned, the address is associated with one or more components of the circuit to which the command is intended.

In operation 408, the interface circuit for each component connected to the reset bus determines if the unpacked address corresponds to an address for its particular component. If matched, the interface circuit knows the command is intended for that particular component and executes the command after the entire command has been received. As discussed above, the entire command may include any number of address packets and data packets. In one embodiment, the command may include an indication of the number of total packets for the command such the interface circuit knows when the entire command is received.

Upon execution, the component may provide a response to the reset controller of the reset bus. This may occur in cases where the command is a read request or where the command requests an acknowledgement message from the component when the command is executed. In such examples, the interface circuit may assert the NB valid signal on the reset bus in operation 410. While keeping the NB valid signal asserted, the interface circuit may transmit one or more return packets on the reset bus back to the reset controller in operation 412. The return packets may include any number of data packets as requested in the received command.

Figure 5:
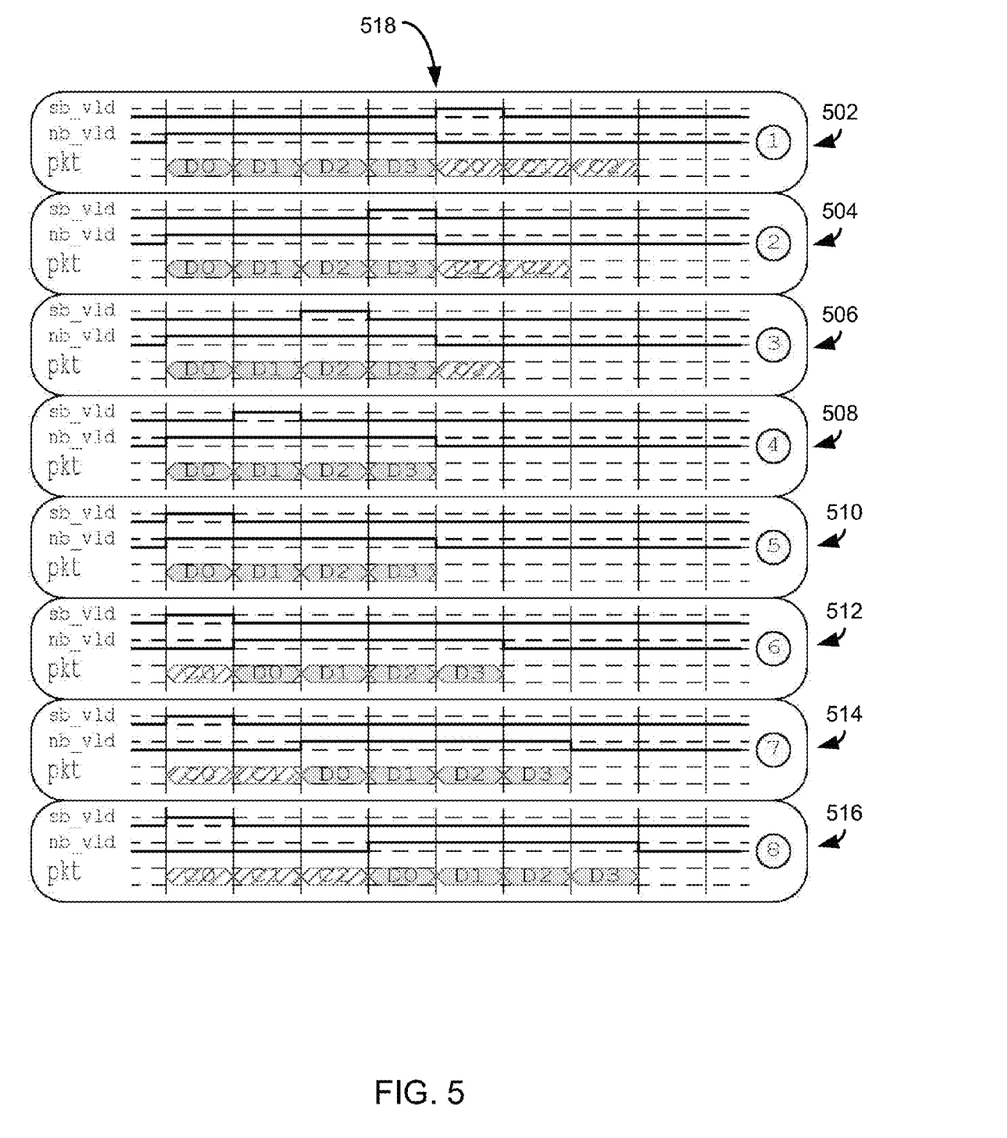
FIG. 5 is a timing diagram illustrating several instances of conflicts on a reset bus from inbound and outbound messages.

Conflicts between NB traffic and SB traffic may occur on the reset bus 106 as messages and packets are transmitted along the bus. For example, FIG. 5 is a timing diagram illustrating several instances of conflicts on a reset bus from inbound and outbound messages. In particular, the timing diagrams 502-516 illustrate instances where inbound packets overlap with outbound packets on the reset bus 106, indicating that some packets are missed or overwritten on the reset bus. This may occur, in one example, at the branch points of the reset bus as a branch section of the bus rejoins the main section of the bus. The branching of the reset bus and joining of the branches of the bus are discussed in more detail below with reference to FIGS. 6-8.

Timing diagram 502 of FIG. 5 illustrates a case where no overlap of the packets on the reset bus occurs. In particular, the NB valid signal is asserted during transmission of the NB data packets. In this case, all of the NB data packets are transmitted on the reset bus before the SB packets are transmitted. For example, at time 518 of timing diagram 502, the NB valid signal is de-asserted while the SB valid signal is asserted, indicating that a SB command is being transmitted on the bus. As such, the NB data packets were all transmitted on the bus before transmission of the SB packets.

However, timing diagrams 504-514 all illustrate various instances in which the NB packets overlap with the SB packets such that some packets are missed or dropped from the bus. For example, in timing diagram 504, SB packet C0 and NB packet D3 overlap or are present on the bus at the same time. This is indicated in timing signal 504 by the SB valid signal being asserted at the same time that the NB valid signal is asserted. As both signals cannot be asserted at the same time for proper transmission of the packets on the bus, this indicates a conflict of packets on the reset bus. A similar instance of packet overlap where the SB valid signal and the NB valid signal are asserted at the same time is illustrated in timing diagrams 506-510. In these instances, at least one of NB packets C0-C1 overlap with at least one SB packet D0-D3.

In timing diagrams 512 and 514 of FIG. 5, the NB valid signal and the SB valid signal are not asserted at the same time. However, a conflict still occurs between the NB packets and the SB packets in these instances 512, 514. In particular, while the NB packets (D0-D2) occur on the reset bus after the SB valid signal, not enough time elapses between the beginning of the transmission of the SB packets (C0-C2) on the reset bus and the beginning of the NB packets such that the NB packets overlap with SB packet C1 and/or C2. Thus, a conflict on the reset bus may occur when NB packets are placed on the bus before all of the packets for a SB message or command is complete.

In response to a conflict situation on the reset bus, the components connected to or otherwise associated with the reset bus may disregard or dismiss a received request message that is corrupted by the conflict. As such, the components may monitor the reset bus and dismiss a request message if the SB valid signal is asserted at the same time the NB valid signal is asserted or if the NB valid signal is asserted before the entirety of an SB message or command is received at the component. In these cases, the component may assume a conflict occurred and dismiss the request. Note that the conflict situation arises when an SB request message traveling in one branch is overwritten by the NB response message to the same SB request generated by another branch. In this case, the presence of the NB message means that the SB request has already been serviced, and there is no need to retry the request. The components may, however, distinguish a corrupted SB message so that it will not be misinterpreted and cause unintended effects in the processing of the messages on the bus. The various cases of FIG. 5 discussed above illustrate the combinations of SB valid and NB valid which may indicate a corrupted SB message.

Figure 6:
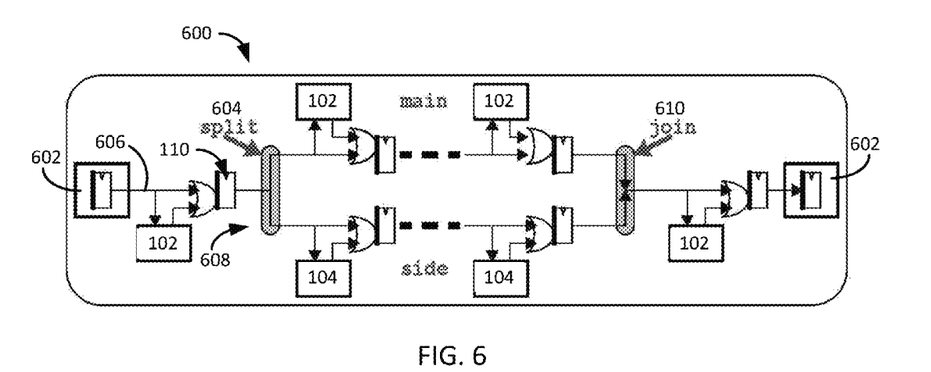
FIG. 6 is a circuit diagram illustrating a simplified reset bus configuration including a branch bus path for a circuit.

As discussed above, the reset bus may include one or more branches from a main bus portion. In one embodiment, such branches may be utilized to access the interior portion of a circuit from an outer ring of the reset bus. Returning to the embodiment illustrated in FIG. 1, two branches 112 are illustrated from the outer ring 106 of the reset bus through the interior of the circuit 100. Although two such branches are shown, any number of branches may be included in a reset bus 106 configuration for a circuit. For example, FIG. 6 is a circuit diagram illustrating a simplified reset bus configuration including a single branch bus path from a main bus path. The general form of the circuit 600 of FIG. 6 may be utilized in a circuit to include any number of branch paths of a reset bus for the circuit.

The circuit 600 of FIG. 6 includes many of the same components discussed above. For example, the circuit 600 may include a reset controller 602, one or more components 102 of the circuit that connect to the reset bus, and an interface circuit 110 associated with each component connected to the reset bus. To create a branch path 608 from a main path 606 of the reset bus, a split circuit 604 and join circuit 610 may be utilized. Although discussed herein as a "branch path" and a "main path", it should be appreciated that the names of the paths of the reset bus are for clarity purposes only and each path may be any length. Thus, in some embodiments, the branch path 608 may be longer or may include more components 102 connected to the path than the main path. Further, although shown as two components in FIG. 6, the reset controller 602 illustrated may be the same component such that the reset bus forms a circle path around the circuit 600 for reset control procedures described above.

Figure 7:
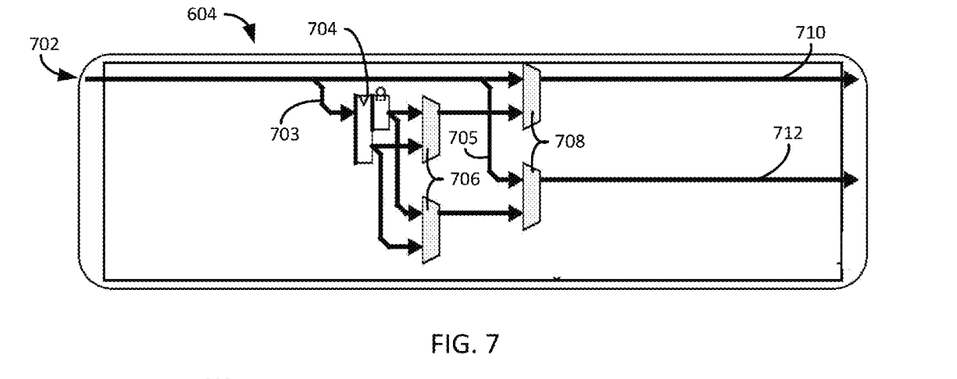
FIG. 7 is a circuit diagram of a split circuit utilized by a circuit with a branching reset bus.

One embodiment of a split circuit 604 of the reset bus is illustrated in FIG. 7. In general, the split circuit 604 operates to split the reset bus from one path into two paths. Each path of the reset bus after the split includes the same signals and information transmitted down the paths. However, once the reset bus is split, signals or information put onto the reset bus by components connected to the paths may not be seen by the opposing path until joined by the join circuit 610.

To split the reset bus, the circuit connects to the reset bus 702 at some point. A first transmission path 703 is included from the reset bus 702 to a latch 704. The latch 704 may introduce some delay into the branch path of the reset bus if desired by the circuit designer or operator. The selection of the delayed branch path may be made through one or more delay multiplexers 706 connected in series in the branch path 712. A second transmission path 705 is also included in the split circuit 604 for instances where no delay in the branch path is desired. A second group of multiplexers 708 may be used to select a delayed branch path 712 or delayed main path 710 of the reset bus. Regardless of if delay is introduced into the reset bus through the split circuit 604, two reset bus paths are created as an output of the split circuit, a main path 710 and a split, side, or branch path 712. Operation of the two paths is the same as described above in relation to the components 102 of the circuit 600 connected to the respective paths. Through the use of the split circuit 604 in the reset bus, a branch or side path 712 of the reset bus may be created that includes all of the SB data and signals as if the branch path is a part of the main path 710. Two examples of the branch paths are illustrated in FIG. 1 as branch path 114 and branch path 116. Any number of such branch paths may be present on the reset bus of the circuit.

Figure 8:
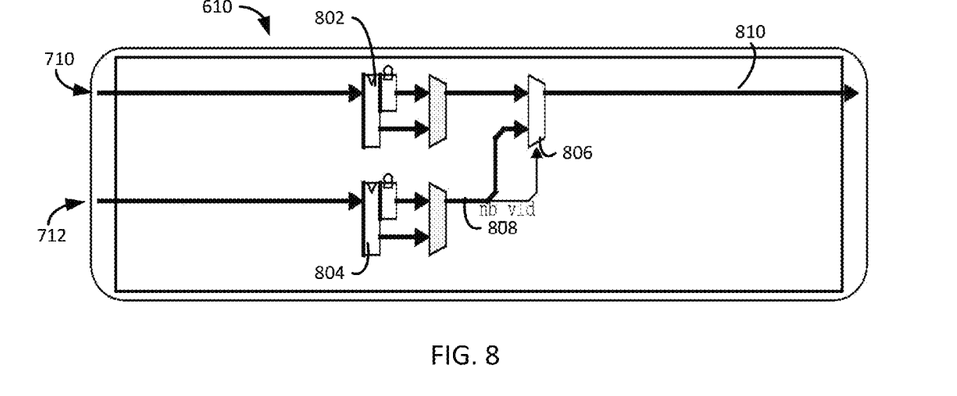
FIG. 8 is a circuit diagram of a join circuit utilized by a circuit with a branching reset bus.

To rejoin branch paths back onto the main path of the reset bus, a join circuit 610 may be utilized. FIG. 8 is a circuit diagram of a join circuit 610 utilized by a circuit with a branching reset bus. The main reset bus path 710 and the branch path 712 may be inputs to the join circuit 610. A latch and multiplexer combination circuit 802, 804 may be connected in series to each path 710, 712. The latch circuits 802, 804 may be utilized by the circuit 600 to synchronize signals and data transmitted on the paths 710, 712. Each path may then be provided as inputs to a multiplexer 806. In one embodiment, the multiplexer 806 may be controlled by the NB valid signal 808 to determine which input is output from the multiplexer 806. Thus, the multiplexer 806 is configured to output the main path 710 of the reset bus until an asserted NB valid signal 808 is provided by a component on the branch path 712. Because the main path 710 and the branch path 712 include the same SB packets and signals, the SB packets included on the branch path may not need to be joined on the main path. However, a component 102 connected to the branch path 712 may provide response packets or information on the branch path. In such a case, the component 102 may assert the NB valid signal 808 to indicate that information is transmitted on the branch path 712. This information is then joined with the main path 710 of the reset bus for transmission to the reset controller 602. The output of the multiplexer 806 is then the combined main path 710 and branch path 712 of the bus.

As discussed above, conflicts between NB packets and SB packets on the reset bus may occur. In one example, a conflict may occur at the join circuit 610, and more particularly at the multiplexer 806. For example, during transmission of a SB packet message on the main path 710, a NB packet from the branch path 712 may arrive at the multiplexer 806. Because the multiplexer 806 is configured to output the branch path 712 when an asserted NB valid signal 808 is received, the SB packets may be overwritten for transmission of the NB packets on the branch path 712. Resolution of these conflicts is discussed above in relation to FIG. 5.

Through the embodiments discussed herein, a reset controller bus or other type of general purpose bus may be used by a circuit for performing a reset procedure for the circuit. In particular, the reset controller signals used to generate the reset sequence of the circuit may be transmitted to the components of the system through the bus, rather than utilizing a direct wire connection between the components and the reset controller. By utilizing the reset bus, the number of wires in the circuit used to transmit the reset control signals to the components of the circuit is greatly reduced over previous designs. This may free up space on the circuit layout that may then be utilized to improve the overall performance of the circuit without losing the reset sequence functionality.

Figure 9:
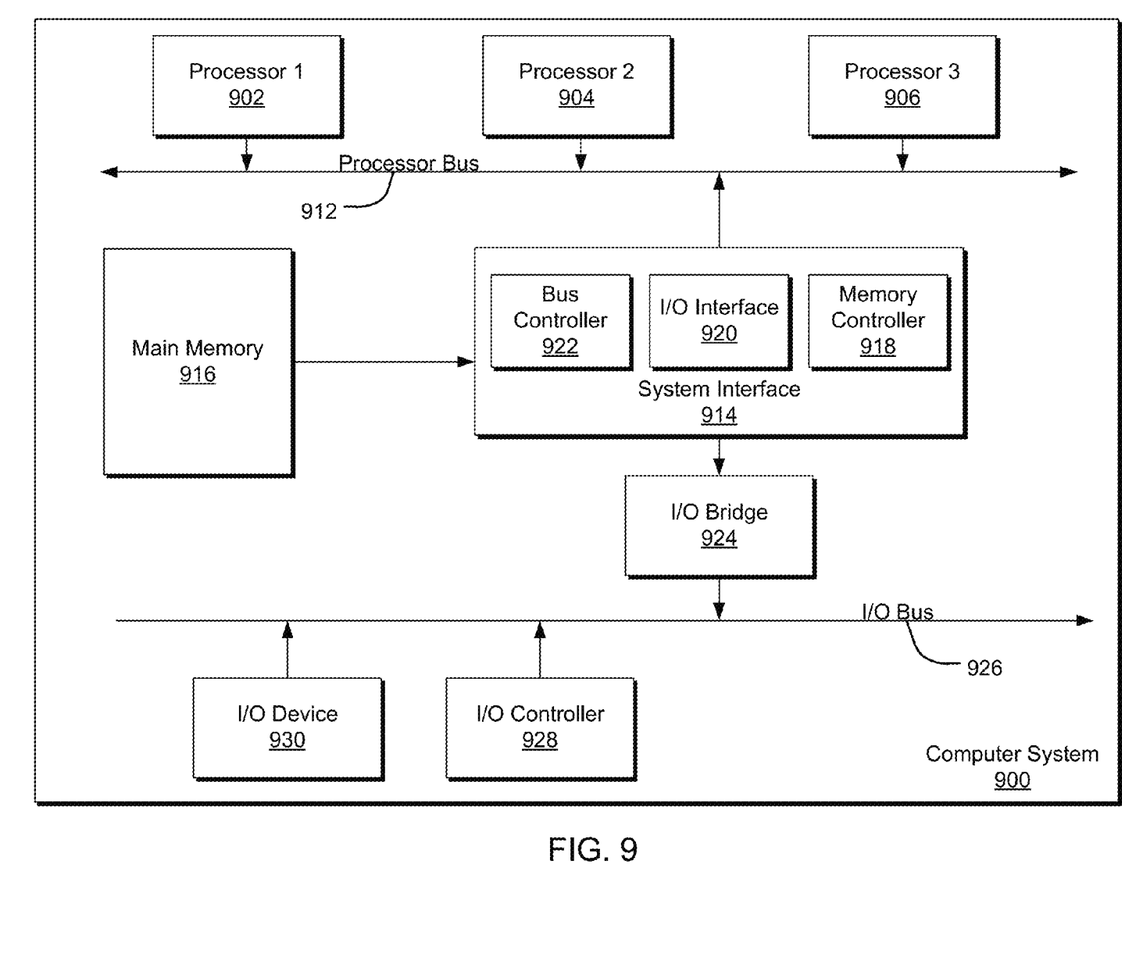
FIG. 9 is a block diagram illustrating an example of a computing system which may be used in implementing embodiments of the present disclosure.

FIG. 9 is a block diagram illustrating an example of a computing device or computer system 900 in which the reset controller bus described above may be implemented. For example, one or more of the components of the computing device of FIG. 9 may include the reset controller bus configuration described above. The computer system (system) includes one or more processors 902-906. Processors 902-906 may include one or more internal levels of cache (not shown) and a bus controller or bus interface unit to direct interaction with the processor bus 912. Processor bus 912, also known as the host bus or the front side bus, may be used to couple the processors 902-906 with the system interface 914. System interface 914 may be connected to the processor bus 912 to interface other components of the system 900 with the processor bus 912. For example, system interface 914 may include a memory controller 918 for interfacing a main memory 916 with the processor bus 912. The main memory 916 typically includes one or more memory cards and a control circuit (not shown). System interface 914 may also include an input/output (I/O) interface 920 to interface one or more I/O bridges or I/O devices with the processor bus 912. One or more I/O controllers and/or I/O devices may be connected with the I/O bus 926, such as I/O controller 928 and I/O device 930, as illustrated.

I/O device 930 may also include an input device (not shown), such as an alphanumeric input device, including alphanumeric and other keys for communicating information and/or command selections to the processors 902-906. Another type of user input device includes cursor control, such as a mouse, a trackball, or cursor direction keys for communicating direction information and command selections to the processors 902-906 and for controlling cursor movement on the display device.

System 900 may include a dynamic storage device, referred to as main memory 916, or a random access memory (RAM) or other computer-readable devices coupled to the processor bus 912 for storing information and instructions to be executed by the processors 902-906. Main memory 916 also may be used for storing temporary variables or other intermediate information during execution of instructions by the processors 902-906. System 900 may include a read only memory (ROM) and/or other static storage device coupled to the processor bus 912 for storing static information and instructions for the processors 902-906. The system set forth in FIG. 9 is but one possible example of a computer system that may employ or be configured in accordance with aspects of the present disclosure.

According to one embodiment, the above techniques may be performed by computer system 900 in response to processor 904 executing one or more sequences of one or more instructions contained in main memory 916. These instructions may be read into main memory 916 from another machine-readable medium, such as a storage device. Execution of the sequences of instructions contained in main memory 916 may cause processors 902-906 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 916. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It should be noted that the flowcharts of FIG. 4 is illustrative only. Alternative embodiments of the present invention may add operations, omit operations, or change the order of operations without affecting the spirit and scope of the present invention. The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A microelectronic circuit comprising:
    a plurality of logic portions of the microelectronic circuit, each of the plurality of logic portions comprising at least one component configured to be resettable during a restart of the microelectronic circuit;
    a reset communication bus in electrical communication with each of the plurality of logic portions, the reset communication bus configured in a ring formation serially connected to each of the plurality of logic portions along the ring formation such that messages are transmitted on the reset communication bus in a one direction around the ring formation; and
    a reset controller electrically connected to the reset communication bus and configured to transmit a plurality of reset control messages each comprising a reset control message address and a reset control message command on the reset communication bus and receive one or more response messages from the reset communication bus, the plurality of reset control messages transmitted around the ring formation in the one direction and returning to the reset controller, wherein the plurality of logic portions execute the reset control message commands of the plurality of reset control messages to generate a reset sequence of the microelectronic circuit;

wherein each of the plurality of logic portions further comprise an associated address and receive each of the plurality of reset control messages transmitted on the reset communication bus from the reset controller to obtain the reset control message address of the received plurality of reset control messages and to execute the reset control message command if the reset control message address matches the associated address for the logic portion.

2. The microelectronic circuit of claim 1 wherein the reset communication bus comprises a plurality of control message transmitters, a first valid signal transmitter, and a second valid signal transmitter.

3. The microelectronic circuit of claim 2 wherein an asserted signal on the first valid signal transmitter of the reset communication bus indicates a valid reset control message on one or more of the plurality of control message transmitters.

4. The microelectronic circuit of claim 2 wherein an asserted signal on the second valid signal transmitter of the reset communication bus indicates a valid response message on one or more of the plurality of control message transmitters.

5. The microelectronic circuit of claim 4 wherein each of the plurality of logic portions of the microelectronic circuit is further configured to assert the second valid signal transmitter and transmit the response message on the one or more of the plurality of control message transmitters.

6. The microelectronic circuit of claim 2 wherein the plurality of reset control messages comprises a plurality of packets transmitted on the plurality of control message transmitters.

7. The microelectronic circuit of claim 6 wherein the plurality of packets for a read reset control message comprises a plurality of address packets.

8. The microelectronic circuit of claim 6 wherein the plurality of packets for a write reset control message comprises a plurality of address packets and a plurality of data packets.

9. The microelectronic circuit of claim 1 wherein the reset communication bus comprises a ring structure around the plurality of logic portions of an outer portion of the microelectronic circuit.

10. The microelectronic circuit of claim 9 wherein the reset communication bus further comprises a branch path through an interior portion of the microelectronic circuit.

11. A method for resetting a microelectronic circuit comprising:
transmitting, from a reset controller, a plurality of reset control messages each comprising a reset control message address and a reset control message command on a reset communication bus to a plurality of logic portions of the microelectronic circuit, the reset communication bus configured in a ring formation serially connected to each of the plurality of logic portions along the ring formation such that the plurality of reset control messages are transmitted on the reset communication bus in a one direction around the ring formation, wherein each of the plurality of logic portions is in electrical communication with the reset communication bus and comprises at least one component configured to be resettable during a restart of the microelectronic circuit by executing the reset control message commands of the plurality of reset control messages to generate a reset sequence of the microelectronic circuit; and receiving one or more response messages from the reset communication bus;

wherein each of the plurality of logic portions further comprise an associated address and receive each of the plurality of reset control messages transmitted on the reset communication bus from the reset controller around the ring formation in the one direction and returning to the reset controller to obtain the reset control message address of the received plurality of reset control messages and to execute the reset control message command if the reset control message address matches the associated address for the logic portion.

12. The method of claim 11 wherein the reset communication bus comprises a plurality of control message transmitters, a first valid signal transmitter, and a second valid signal transmitter.

13. The method of claim 12 further comprising asserting a signal on the first valid signal transmitter of the reset communication bus to indicate a valid reset control message on one or more of the plurality of control message transmitters.

14. The method of claim 12 further comprising asserting a signal on the second valid signal transmitter of the reset communication bus to indicate a valid response message on one or more of the plurality of control message transmitters.

15. The method of claim 14 wherein each of the plurality of logic portions of the microelectronic circuit is further configured to assert the second valid signal transmitter and transmit the valid response message on the one or more of the plurality of control message transmitters.

16. The method of claim 12 wherein the plurality of reset control messages comprises a plurality of packets transmitted on the plurality of control message transmitters.

17. The method of claim 16 wherein the plurality of packets for a read reset control message comprises a plurality of address packets.

18. The method of claim 16 wherein the plurality of packets for a write reset control message comprises a plurality of address packets and a plurality of data packets.

* * * * *